United States Patent
Muratani et al.

(10) Patent No.: US 12,360,340 B2
(45) Date of Patent: Jul. 15, 2025

(54) OPTICAL SYSTEM, OPTICAL APPARATUS, AND METHOD FOR MANUFACTURING OPTICAL SYSTEM

(71) Applicant: Nikon Corporation, Tokyo (JP)

(72) Inventors: Mami Muratani, Tokyo (JP); Taku Matsuo, Tokyo (JP); Satoshi Miwa, Tokyo (JP); Yoko Komatsubara, Tokyo (JP); Akino Kondo, Tokyo (JP)

(73) Assignee: Nikon Corporation, Tokyo (JP)

( * ) Notice: Subject to any disclaimer, the term of this patent is extended or adjusted under 35 U.S.C. 154(b) by 506 days.

(21) Appl. No.: 17/917,551

(22) PCT Filed: Jan. 12, 2021

(86) PCT No.: PCT/JP2021/000726
§ 371 (c)(1),
(2) Date: Oct. 6, 2022

(87) PCT Pub. No.: WO2022/085208
PCT Pub. Date: Apr. 28, 2022

(65) Prior Publication Data
US 2023/0143770 A1 May 11, 2023

(30) Foreign Application Priority Data
Oct. 22, 2020 (JP) .................. 2020-177211

(51) Int. Cl.
*G02B 9/12* (2006.01)
*G02B 9/64* (2006.01)
(Continued)

(52) U.S. Cl.
CPC ............... *G02B 9/12* (2013.01); *G02B 13/18* (2013.01); *G02B 9/64* (2013.01); *G02B 15/143101* (2019.08); *G02B 15/143103* (2019.08)

(58) Field of Classification Search
CPC .... G02B 15/143103; G02B 15/143101; G02B 13/18
See application file for complete search history.

(56) References Cited

U.S. PATENT DOCUMENTS

2013/0314804 A1   11/2013   Kubota et al.
2019/0004286 A1*   1/2019   Heu .................. G02B 15/143
(Continued)

FOREIGN PATENT DOCUMENTS

CN      111465881 A      7/2020
JP    2013-242449 A     12/2013
(Continued)

OTHER PUBLICATIONS

International Search Report from International Patent Application No. PCT/JP2021/000726, Mar. 30, 2021.
(Continued)

*Primary Examiner* — Alexander P Gross
(74) *Attorney, Agent, or Firm* — Potomac Law Group, PLLC

(57) ABSTRACT

An optical system used in an optical apparatus, such as a camera 1, is configured to include a plurality of lens groups such that at focusing the distances between the lens groups are varied, that a final lens group disposed closest to an image side of the lens groups includes at least one lens surface having a pole, and that all of the following conditional expressions are satisfied:

$$0.020 < Y/f < 0.120 \qquad (1)$$

$$0.010 < Bf/TL < 0.150 \qquad (2)$$

where Y is image height, f is the focal length of the optical system, TL is the total optical length of the optical system, and Bf is the back focus of the optical system.

18 Claims, 8 Drawing Sheets

(51) Int. Cl.
    *G02B 13/18*     (2006.01)
    *G02B 15/14*     (2006.01)

(56) References Cited

U.S. PATENT DOCUMENTS

| | | |
|---|---|---|
| 2019/0162932 A1 | 5/2019 | Saito et al. |
| 2021/0191112 A1 | 6/2021 | Yamashita et al. |
| 2022/0075163 A1* | 3/2022 | Tang .................. G02B 15/143 |

FOREIGN PATENT DOCUMENTS

| | | |
|---|---|---|
| JP | 2015-102733 A | 6/2015 |
| JP | 2018-072457 A | 5/2018 |
| JP | 2019-101183 A | 6/2019 |
| WO | WO 2019/116569 A1 | 6/2019 |

OTHER PUBLICATIONS

Office Action issued Jun. 1, 2023, in Chinese Patent Application No. 202180019804.4.

\* cited by examiner

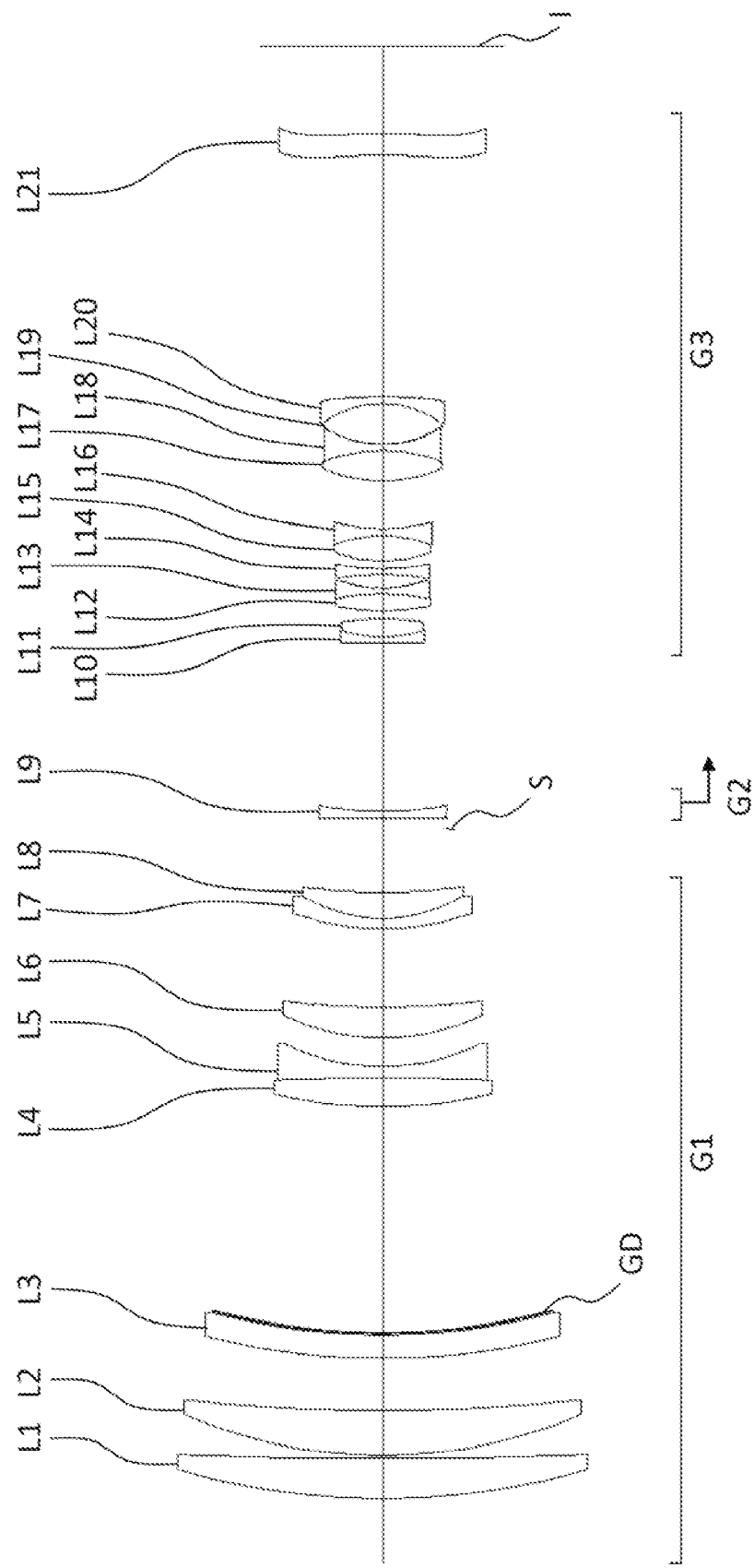

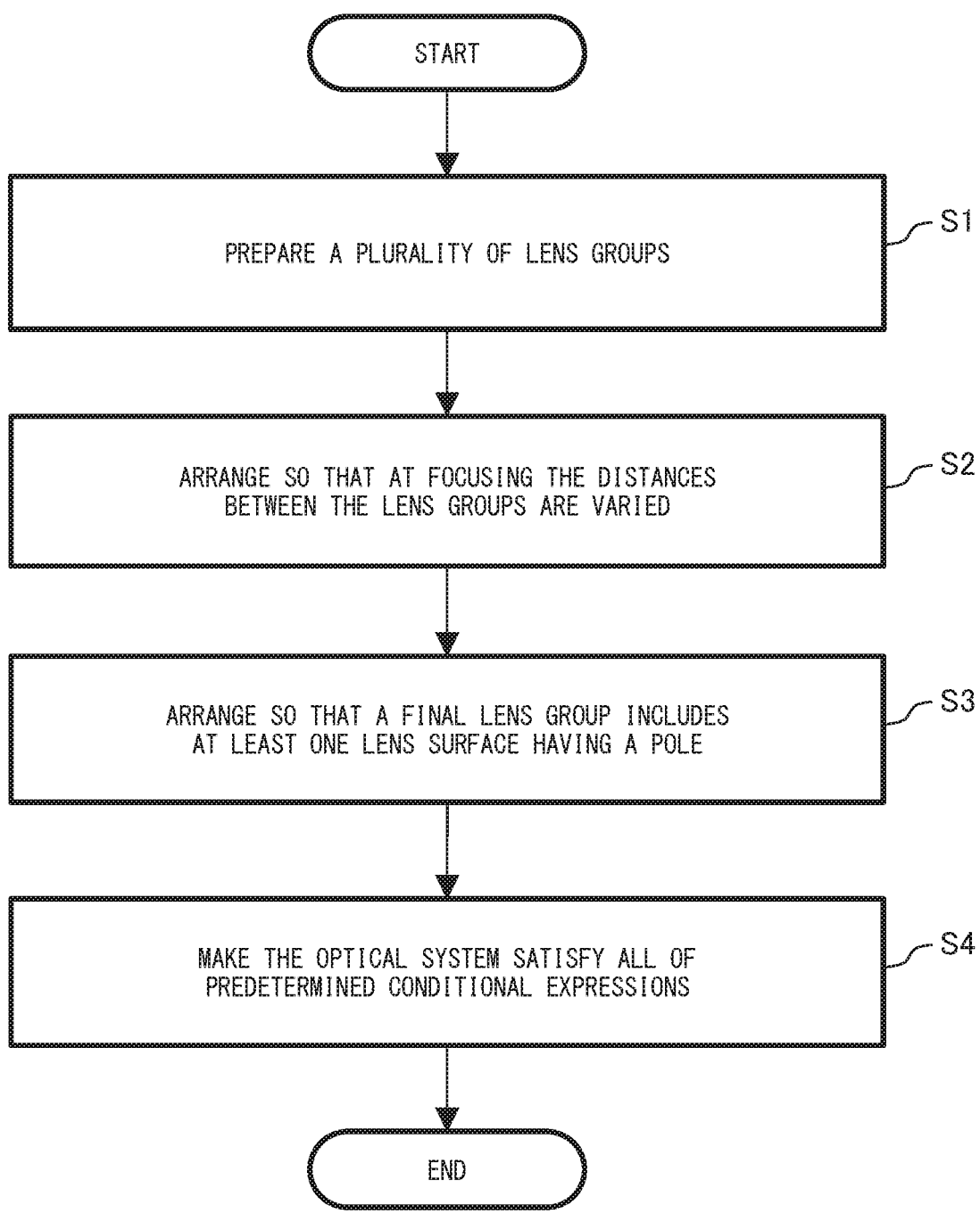

OPTICAL SYSTEM, OPTICAL APPARATUS, AND METHOD FOR MANUFACTURING OPTICAL SYSTEM

FIELD

The present invention relates to an optical system, an optical apparatus, and a method for manufacturing an optical system.

BACKGROUND

Optical systems used in optical apparatuses, such as cameras for photographs, electronic still cameras, and video cameras, have been proposed (see, e.g., Patent Literature 1).

CITATION LIST

Patent Literature

Patent Literature 1: Japanese Unexamined Patent Publication No. 2018-072457

SUMMARY

An optical system of the present disclosure includes a plurality of lens groups, at focusing the distances between the lens groups are varied, a final lens group disposed closest to an image side of the lens groups includes at least one lens surface having a pole, and all of the following conditional expressions are satisfied:

$$0.020 < Y/f < 0.120$$

$$0.010 < Bf/TL < 0.150$$

where
Y is image height,
f is the focal length of the optical system,
TL is the total optical length of the optical system, and
Bf is the back focus of the optical system.

A method for manufacturing an optical system of the present disclosure is a method for manufacturing an optical system including a plurality of lens groups, at focusing the distances between the lens groups are varied, a final lens group disposed closest to an image side of the lens groups includes at least one lens surface having a pole, and the method includes arranging so that all of the following conditional expressions are satisfied:

$$0.020 < Y/f < 0.120$$

$$0.010 < Bf/TL < 0.150$$

where
Y is image height,
f is the focal length of the optical system,
TL is the total optical length of the optical system, and
Bf is the back focus of the optical system.

BRIEF DESCRIPTION OF DRAWINGS

FIG. 5 is a cross-sectional view of an optical system of a third example focusing on an object at infinity.

FIG. 8 is a flowchart outlining a method for manufacturing an optical system of the embodiment.

DESCRIPTION OF EMBODIMENTS

Figure 1:
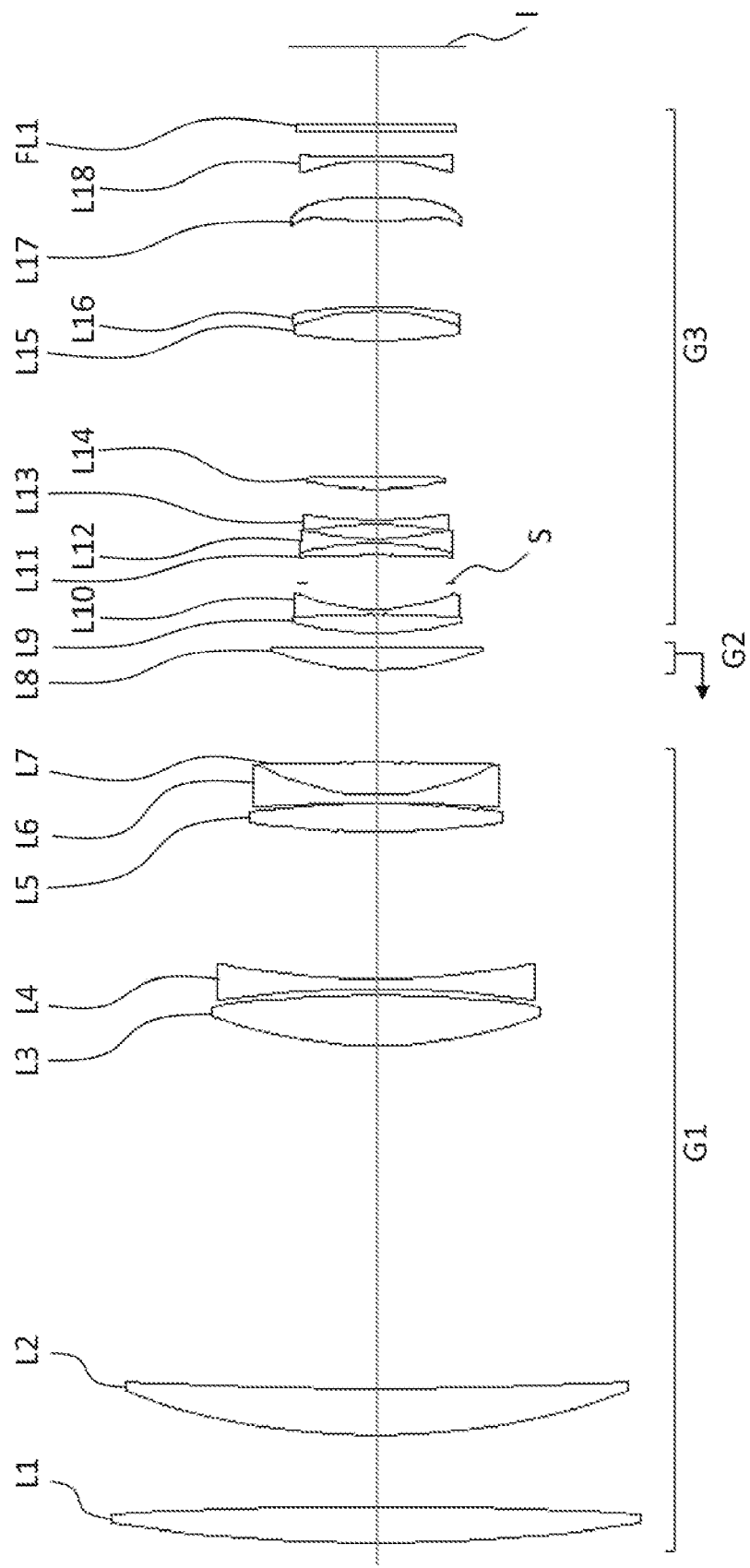
FIG. 1 is a cross-sectional view of an optical system of a first example focusing on an object at infinity.

The following describes an optical system, an optical apparatus, and a method for manufacturing an optical system of an embodiment of the present application.

An optical system of the present embodiment includes a plurality of lens groups, at focusing the distances between the lens groups are varied, a final lens group disposed closest to an image side of the lens groups includes at least one lens surface having a pole, and all of the following conditional expressions are satisfied. A pole in the present disclosure refers to a point on a lens surface, other than on an optical axis, at which the tangent plane of the lens surface crosses the optical axis perpendicularly.

$$0.020 < Y/f < 0.120 \quad (1)$$

$$0.010 < Bf/TL < 0.150 \quad (2)$$

where
Y is image height,
f is the focal length of the optical system,
TL is the total optical length of the optical system, and
Bf is the back focus of the optical system.

The optical system of the present embodiment, in which the final lens group includes a lens surface having a pole, can reduce axial and off-axis aberrations effectively.

The optical system of the present embodiment can correct off-axis aberrations of image height, such as coma aberration, favorably by setting the value of conditional expression (1) less than the upper limit. The effect of the optical system of the present embodiment can be further ensured by setting the upper limit of conditional expression (1) at 0.120. To further ensure the effect of the present embodiment, the upper limit of conditional expression (1) is preferably set at 0.110, 0.100, 0.095, 0.090, 0.085, 0.080, 0.075, 0.070, 0.065, 0.063, or 0.060, more preferably at 0.058.

The optical system of the present embodiment can correct chromatic aberration at an appropriate focal length favorably by setting the value of conditional expression (1) greater than the lower limit. The effect of the optical system of the present embodiment can be further ensured by setting the lower limit of conditional expression (1) at 0.020. To further ensure the effect of the present embodiment, the upper limit of conditional expression (1) is preferably set at 0.025, 0.028, 0.030, or 0.033, more preferably at 0.035.

In the present embodiment, setting the value of conditional expression (2) less than the upper limit prevents the back focus from being too long and the optical system from upsizing. The effect of the optical system of the present embodiment can be further ensured by setting the upper limit of conditional expression (2) at 0.150. To further ensure the effect of the present embodiment, the upper limit of conditional expression (2) is preferably set at 0.120, 0.100, 0.090, 0.085, or 0.080, more preferably at 0.075.

The optical system of the present embodiment can correct off-axis aberrations, such as coma aberration, favorably by setting the value of conditional expression (2) greater than the lower limit. The effect of the optical system of the present embodiment can be further ensured by setting the lower limit of conditional expression (2) at 0.010. To further ensure the effect of the present embodiment, the lower limit of conditional expression (2) is preferably set at 0.013, 0.015, 0.018, or 0.020, more preferably at 0.022.

A small-sized optical system of favorable imaging performance can be achieved by the above configuration.

In the optical system of the present embodiment, the at least one lens surface having a pole preferably satisfies the following conditional expression:

$$0.02 < h/Y < 1.20 \quad (3)$$

where h is the height from an optical axis of the pole closest to the optical axis on the lens surface having a pole.

The optical system of the present embodiment can correct axial aberration and off-axis aberrations, such as coma aberration, distortion, and curvature of field, in a balanced manner by satisfying conditional expression (3).

The effect of the optical system of the present embodiment can be further ensured by setting the upper limit of conditional expression (3) at 1.20. To further ensure the effect of the present embodiment, the upper limit of conditional expression (3) is preferably set at 1.15, 1.10, 1.05, or 1.00, more preferably at 0.95.

The effect of the optical system of the present embodiment can be further ensured by setting the lower limit of conditional expression (3) at 0.02. To further ensure the effect of the present embodiment, the lower limit of conditional expression (3) is preferably set at 0.05, 0.10, 0.25, 0.30, 0.35, 0.40, or 0.45, more preferably at 0.50.

The optical system of the present embodiment preferably includes one or more positive lenses that are lenses including the lens surface having a pole and that have positive refractive power, and at least one of the one or more positive lenses preferably satisfies the following conditional expression:

$$-0.15 < (Dh-Dc)/rK < 0.00 \quad (4)\text{-}1$$

where

Dh is the thickness on an optical axis of a lens including the lens surface having a pole, Dc is the thickness at the pole of the lens including the lens surface having a pole, and rK is the effective radius of the lens including the lens surface having a pole.

The optical system of the present embodiment can correct curvature of field favorably and control the position of an exit pupil appropriately by satisfying conditional expression (4)-1.

The effect of the optical system of the present embodiment can be further ensured by setting the upper limit of conditional expression (4)-1 at 0.00. To further ensure the effect of the present embodiment, the upper limit of conditional expression (4)-1 is preferably set at −0.03, −0.05, or −0.08, more preferably at −0.10.

The effect of the optical system of the present embodiment can be further ensured by setting the lower limit of conditional expression (4)-1 at −0.15. To further ensure the effect of the present embodiment, the lower limit of conditional expression (4)-1 is preferably set at −0.13.

The optical system of the present embodiment preferably includes one or more negative lenses that are lenses including the lens surface having a pole and that have negative refractive power, and at least one of the one or more negative lenses preferably satisfies the following conditional expression:

$$0.000 < (Dh-Dc)/rK < 0.100 \quad (4)\text{-}2$$

where

Dh is the thickness on an optical axis of a lens including the lens surface having a pole, Dc is the thickness at the pole of the lens including the lens surface having a pole, and rK is the effective radius of the lens including the lens surface having a pole.

The optical system of the present embodiment can correct curvature of field favorably and control the position of an exit pupil appropriately by satisfying conditional expression (4)-2.

The effect of the optical system of the present embodiment can be further ensured by setting the upper limit of conditional expression (4)-2 at 0.100. To further ensure the effect of the present embodiment, the upper limit of conditional expression (4)-2 is preferably set at 0.095, 0.090, 0.085, or 0.080, more preferably at 0.075.

The effect of the optical system of the present embodiment can be further ensured by setting the lower limit of conditional expression (4)-2 at 0.000. To further ensure the effect of the present embodiment, the lower limit of conditional expression (4)-2 is preferably set at 0.003, more preferably at 0.005.

The optical system of the present embodiment preferably satisfies the following conditional expression:

$$0.020 < KML/TL < 0.140 \quad (5)$$

where

KML is the distance from the lens surface having a pole closest to an image plane to the image plane.

The optical system of the present embodiment can correct curvature of field favorably by setting the value of conditional expression (5) less than the upper limit. The effect of the optical system of the present embodiment can be further ensured by setting the upper limit of conditional expression (5) at 0.140. To further ensure the effect of the present embodiment, the upper limit of conditional expression (5) is preferably set at 0.135, 0.130, 0.125, or 0.120, more preferably at 0.118.

The optical system of the present embodiment can prevent reduction in the amount of ambient light by setting the value of conditional expression (5) greater than the lower limit. The effect of the optical system of the present embodiment can be further ensured by setting the lower limit of conditional expression (5) at 0.020. To further ensure the effect of the present embodiment, the lower limit of conditional expression (5) is preferably set at 0.025, 0.030, 0.035, 0.040, 0.045, or 0.050, more preferably at 0.055.

In the optical system of the present embodiment, at least one lens including the lens surface having a pole preferably satisfies the following conditional expression:

$$0.70 < rK/Y < 1.10 \quad (6)$$

where rK is the effective radius of the lens including the lens surface having a pole.

The optical system of the present embodiment can correct off-axis aberrations, such as coma aberration, distortion, and curvature of field, favorably by satisfying conditional expression (6).

The effect of the optical system of the present embodiment can be further ensured by setting the upper limit of conditional expression (6) at 1.10. To further ensure the effect of the present embodiment, the upper limit of conditional expression (6) is preferably set at 1.05, 1.00, or 0.98, more preferably at 0.95.

The effect of the optical system of the present embodiment can be further ensured by setting the lower limit of conditional expression (6) at 0.70. To further ensure the effect of the present embodiment, the lower limit of conditional expression (6) is preferably set at 0.73, 0.75, 0.78, or 0.80, more preferably at 0.82.

In the optical system of the present embodiment, at least one lens including the lens surface having a pole preferably satisfies the following conditional expression:

$$-0.40 < Bf/fK < 0.40 \quad (7)$$

where
fK is the focal length of the lens including the lens surface having a pole.

The optical system of the present embodiment can control the position of an exit pupil appropriately and correct curvature of field favorably by satisfying conditional expression (7).

The effect of the optical system of the present embodiment can be further ensured by setting the upper limit of conditional expression (7) at 0.40. To further ensure the effect of the present embodiment, the upper limit of conditional expression (7) is preferably set at 0.38, 0.35, or 0.33, more preferably at 0.30.

The effect of the optical system of the present embodiment can be further ensured by setting the lower limit of conditional expression (7) at −0.40. To further ensure the effect of the present embodiment, the lower limit of conditional expression (7) is preferably set at −0.35, −0.30, −0.25, −0.20, or −0.15, more preferably at −0.10.

In the optical system of the present embodiment, at least one lens including the lens surface having a pole preferably satisfies the following conditional expression:

$$25.00 < vdK < 70.00 \quad (8)$$

where
vdK is the Abbe number for d-line of the lens including the lens surface having a pole.

The optical system of the present embodiment can correct chromatic aberration favorably by satisfying conditional expression (8).

The effect of the optical system of the present embodiment can be further ensured by setting the upper limit of conditional expression (8) at 70.00. To further ensure the effect of the present embodiment, the upper limit of conditional expression (8) is preferably set at 68.00 or 66.00, more preferably at 65.00.

The effect of the optical system of the present embodiment can be further ensured by setting the lower limit of conditional expression (8) at 25.00. To further ensure the effect of the present embodiment, the lower limit of conditional expression (8) is preferably set at 30.00, 35.00, 38.00, or 40.00, more preferably at 42.00.

In the optical system of the present embodiment, at least one lens including the lens surface having a pole preferably satisfies the following conditional expression:

$$-1.00 < fR/fK < 0.60 \quad (9)$$

where
fR is the focal length of the final lens group, and
fK is the focal length of the lens including the lens surface having a pole.

The optical system of the present embodiment can control the position of an exit pupil appropriately and correct curvature of field favorably by satisfying conditional expression (9).

The effect of the optical system of the present embodiment can be further ensured by setting the upper limit of conditional expression (9) at 0.60. To further ensure the effect of the present embodiment, the upper limit of conditional expression (9) is preferably set at 0.55, 0.50, 0.45, or 0.40, more preferably at 0.35.

The effect of the optical system of the present embodiment can be further ensured by setting the lower limit of conditional expression (9) at −1.00. To further ensure the effect of the present embodiment, the lower limit of conditional expression (9) is preferably set at −0.98, −0.95, or −0.93, more preferably at −0.90.

The optical system of the present embodiment preferably satisfies the following conditional expression:

$$-0.50 < Bf/rR < 0.20 \quad (10)$$

where
rR is the radius of curvature of a lens surface disposed closest to the image side.

The optical system of the present embodiment can control the position of an exit pupil appropriately and correct curvature of field favorably by satisfying conditional expression (10).

The effect of the optical system of the present embodiment can be further ensured by setting the upper limit of conditional expression (10) at 0.20. To further ensure the effect of the present embodiment, the upper limit of conditional expression (10) is preferably set at 0.15, 0.10, or 0.05, more preferably at 0.02.

The effect of the optical system of the present embodiment can be further ensured by setting the lower limit of conditional expression (10) at −0.50. To further ensure the effect of the present embodiment, the lower limit of conditional expression (10) is preferably set at −0.48, −0.45, −0.43, −0.40, or −0.38, more preferably at −0.35.

In the optical system of the present embodiment, at least one lens including the lens surface having a pole preferably satisfies the following conditional expression:

$$-2.00 < fK/f < 0.50 \quad (11)$$

where
fK is the focal length of the lens including the lens surface having a pole.

The optical system of the present embodiment can correct axial aberration and off-axis aberrations, such as coma aberration, distortion, and curvature of field, in a balanced manner by satisfying conditional expression (11).

The effect of the optical system of the present embodiment can be further ensured by setting the upper limit of conditional expression (11) at 0.50. To further ensure the effect of the present embodiment, the upper limit of conditional expression (11) is preferably set at 0.45, 0.40, 0.35, or 0.30, more preferably at 0.28.

The effect of the optical system of the present embodiment can be further ensured by setting the lower limit of conditional expression (11) at −2.00. To further ensure the effect of the present embodiment, the lower limit of conditional expression (11) is preferably set at −1.95, −1.90, −1.85, or −1.80, more preferably at −1.75.

The optical system of the present embodiment preferably satisfies the following conditional expression.

$$0.20 < TL/f < 1.10 \quad (12)$$

The optical system of the present embodiment can be prevented from upsizing by setting the value of conditional expression (12) less than the upper limit. The effect of the optical system of the present embodiment can be further ensured by setting the upper limit of conditional expression (12) at 1.10. To further ensure the effect of the present embodiment, the upper limit of conditional expression (12) is preferably set at 1.08, 1.05, or 1.03, more preferably at 1.00.

The optical system of the present embodiment can correct aberrations favorably by setting the value of conditional expression (12) greater than the lower limit. The effect of the optical system of the present embodiment can be further ensured by setting the lower limit of conditional expression (12) at 0.20. To further ensure the effect of the present embodiment, the lower limit of conditional expression (12) is preferably set at 0.25, 0.30, 0.35, 0.40, or 0.43, more preferably at 0.45.

The optical system of the present embodiment preferably satisfies the following conditional expression.

$$0.005 < Bf/f < 0.100 \quad (13)$$

In the present embodiment, setting the value of conditional expression (13) less than the upper limit prevents the back focus from being too long and the optical system from upsizing. The effect of the optical system of the present embodiment can be further ensured by setting the upper limit of conditional expression (13) at 0.100. To further ensure the effect of the present embodiment, the upper limit of conditional expression (13) is preferably set at 0.095, 0.090, 0.085, or 0.080, more preferably at 0.075.

The optical system of the present embodiment can prevent an exit pupil from being too near the image plane and correct off-axis aberrations, such as coma aberration, favorably by setting the value of conditional expression (13) greater than the lower limit. The effect of the optical system of the present embodiment can be further ensured by setting the lower limit of conditional expression (13) at 0.005. To further ensure the effect of the present embodiment, the lower limit of conditional expression (13) is preferably set at 0.008, 0.010, or 0.013, more preferably at 0.015.

The optical system of the present embodiment preferably includes at least one lens Z satisfying all of the following conditional expressions:

$$ndLZ + (0.01425 \times vdLZ) < 2.12 \quad (14)$$

$$vdLZ < 35.00 \quad (15)$$

$$0.702 < \theta gFLZ + (0.00316 \times vdLZ) \quad (16)$$

where
 ndLZ is the refractive index for d-line of the lens Z,
 vdLZ is the Abbe number for d-line of the lens Z, and
 θgFLZ is a partial dispersion ratio of the lens Z and is defined by the following equation:

$$\theta gFLZ = (ngLZ - nFLZ)/(nFLZ - nCLZ)$$

where the refractive indices for g-line, F-line, and C-line of the lens Z are denoted by ngLZ, nFLZ, and nCLZ, respectively.

The optical system of the present embodiment having such a configuration can correct aberrations favorably.

Setting the value of conditional expression (14) less than the upper limit prevents the Petzval sum from being too small and enables the optical system of the present embodiment to correct curvature of field favorably. The effect of the present embodiment can be further ensured by setting the upper limit of conditional expression (14) at 2.12. To further ensure the effect of the present embodiment, the upper limit of conditional expression (14) is preferably set at 2.10, more preferably at 2.08.

The optical system of the present embodiment can correct quadratic variance of axial chromatic aberration favorably by setting the value of conditional expression (15) less than the upper limit. The effect of the present embodiment can be further ensured by setting the upper limit of conditional expression (15) at 35.00. To further ensure the effect of the present embodiment, the upper limit of conditional expression (15) is preferably set at 33.50, 32.50, 31.00, or 30.00, more preferably at 28.50.

The optical system of the present embodiment can correct quadratic variance of axial chromatic aberration favorably by setting the value of conditional expression (16) greater than the lower limit. The effect of the present embodiment can be further ensured by setting the lower limit of conditional expression (16) at 0.702. To further ensure the effect of the present embodiment, the upper limit of conditional expression (16) is preferably set at 0.705, 0.708, 0.710, 0.712, or 0.714, more preferably at 0.716.

The optical system of the present embodiment preferably includes at least one lens X satisfying the following conditional expression:

$$80.00 < vdLX \quad (17)$$

where
 vdLX is the Abbe number for d-line of the lens X.

The optical system of the present embodiment including the lens X satisfying conditional expression (17) can correct chromatic aberration favorably.

The effect of the optical system of the present embodiment can be further ensured by setting the lower limit of conditional expression (17) at 80.00. To further ensure the effect of the present embodiment, the lower limit of conditional expression (17) is preferably set at 83.00, 85.00, 88.00, or 90.00, more preferably at 92.50.

In the optical system of the present embodiment, a lens group disposed closest to an object side preferably has positive refractive power.

A small-sized optical system of favorable imaging performance can be achieved by the above configuration.

An optical apparatus of the present embodiment includes the optical system having the above configuration. This enables achieving a small-sized optical apparatus of favorable imaging performance.

A method for manufacturing an optical system of the present embodiment is a method for manufacturing an optical system including a plurality of lens groups, at focusing the distances between the lens groups are varied, a final lens group disposed closest to an image side of the lens groups includes at least one lens surface having a pole, and the method includes arranging so that all of the following conditional expressions are satisfied:

$$0.020 < Y/f < 0.120 \quad (1)$$

$$0.010 < Bf/TL < 0.150 \quad (2)$$

where
 Y is image height,
 f is the focal length of the optical system,
 TL is the total optical length of the optical system, and
 Bf is the back focus of the optical system.

A small-sized optical system of favorable imaging performance can be manufactured by such a method for manufacturing an optical system.

Numerical Examples

Examples of the present application will be described below with reference to the drawings.

First Example

FIG. 1 is a cross-sectional view of an optical system of a first example focusing on an object at infinity.

The optical system of the present example includes a first lens group G1 having positive refractive power, a second lens group G2 having positive refractive power, and a third lens group G3 having negative refractive power, in order from the object side.

The first lens group G1 includes a biconvex positive lens L1, a positive meniscus lens L2 convex on the object side, a biconvex positive lens L3, a biconcave negative lens L4, a biconvex positive lens L5, and a positive cemented lens composed of a biconcave negative lens L6 and a biconvex positive lens L7, in order from the object side.

The second lens group G2 includes a positive meniscus lens L8 convex on the object side.

The third lens group G3 includes a negative cemented lens composed of a biconvex positive lens L9 and a biconcave negative lens L10; an aperture stop S; a negative cemented lens composed of a positive meniscus lens L11 convex on the image side and a biconcave negative lens L12; a biconcave negative lens L13; a biconvex positive lens L14; a positive cemented lens composed of a biconvex positive lens L15 and a negative meniscus lens L16 convex on the image side; a biconvex positive lens L17; and a biconcave negative lens L18, in order from the object side.

An imaging device (not shown) constructed from CCD, CMOS or the like is disposed on an image plane I.

A filter FL1 is disposed between the optical system of the present example and the image plane I.

The optical system of the present example focuses by moving the second lens group G2 along the optical axis. When the focus is shifted from infinity to a nearby object, the second lens group G2 moves from the image side toward the object side.

In the optical system of the present example, the negative cemented lens composed of the positive meniscus lens L11 and the negative lens L12 and the negative lens L13, which are lenses included in the third lens group G3, are configured as a vibration reduction lens group movable so that movement has a component in a direction perpendicular to the optical axis to correct an image blur.

In the optical system of the present example, the object-side lens surface of the positive lens L17 and the image-side lens surface of the negative lens L18 included in the third lens group G3 have a pole. The positive lens L17 corresponds to a positive lens that is a lens including a lens surface having a pole and that has positive refractive power. In the optical system of the present example, the positive lens L5 corresponds to the lens Z, and the positive meniscus lens L2 and the positive lens L3 each correspond to the lens X.

Table 1 below shows specifications of the optical system of the present example. In Table 1, f, Fno, and TL denote the focal length, the f-number, and the total optical length of the optical system focusing on infinity, respectively, and Bf denotes the back focus of the optical system.

In [Lens specifications], m denotes the positions of optical surfaces counted from the object side, r the radii of curvature, d the surface-to-surface distances, nd the refractive indices for d-line (wavelength 587.6 nm), and νd the Abbe numbers for d-line. In [Lens specifications], the radius of curvature r=∞ means a plane. In [Lens specifications], the optical surfaces with "*" are aspherical surfaces.

In [Aspherical surface data], ASP denotes the optical surface corresponding to the aspherical surface data, K the conic constant, and A4 to A20 the spherical constants.

The aspherical surfaces are expressed by expression (a) below, where the height in a direction perpendicular to the optical axis is denoted by y, the distance along the optical axis from the tangent plane at the vertex of an aspherical surface to the aspherical surface at height y (a sag) by S (y), the radius of curvature of a reference sphere (paraxial radius of curvature) by r, the conic constant by K, and the nth-order aspherical coefficient by An. In the examples, the second-order aspherical coefficient A2 is 0. "E-n" denotes "×10$^{-n}$."

$$S(y)=(y^2/r)/\{1+(1-K\times y^2/r^2)^{1/2}\}+A4\times y^4+A6\times y^6+A8\times y^8+A10\times y^{10}+A12\times y^{12}+A14\times y^{14}+A16\times y^{16}+A18\times y^{18}+A20\times y^{20} \quad (a)$$

The unit of the focal lengths f, the radii of curvature r, and the other lengths listed in Table 1 is "mm." However, the unit is not limited thereto because the optical performance of a proportionally enlarged or reduced optical system is the same as that of the original optical system.

The above reference symbols in Table 1 will also be used similarly in the tables of the other examples described below.

TABLE 1

| [General specifications] | |
| --- | --- |
| f | 390.00 |
| Fno | 2.90 |
| Bf | 28.455 |
| image height | 21.700 |
| TL | 387.455 |
| 2ω | 6.34 |

| [Lens specifications] | | | | | |
| --- | --- | --- | --- | --- | --- |
| m | r | d | nd | νd | θgF |
| 1) | 480.771 | 9.450 | 1.518600 | 69.89 | |
| 2) | −1180.201 | 18.368 | | | |
| 3) | 190.470 | 12.100 | 1.433837 | 95.16 | |
| 4) | 1088.433 | 88.972 | | | |
| 5) | 121.568 | 12.850 | 1.433837 | 95.16 | |
| 6) | −317.679 | 1.750 | | | |
| 7) | −279.152 | 2.600 | 1.737999 | 32.26 | |
| 8) | 211.486 | 38.050 | | | |
| 9) | 226.884 | 7.300 | 1.663820 | 27.35 | 0.632 |
| 10) | −226.482 | 0.300 | | | |
| 11) | −382.831 | 1.900 | 1.749504 | 35.33 | |
| 12) | 64.198 | 8.350 | 1.437001 | 95.10 | |
| 13) | −3151.863 | D13 | | | |
| 14) | 79.158 | 5.700 | 1.627496 | 59.24 | |
| 15) | 889.670 | D15 | | | |
| 16) | 87.296 | 4.800 | 1.698950 | 30.13 | |
| 17) | −247.699 | 1.200 | 1.881003 | 40.14 | |
| 18) | 52.070 | 7.100 | | | |
| 19> | ∞ | 7.032 | (aperture stop) | | |
| 20) | −370.162 | 2.900 | 1.846663 | 23.78 | |
| 21) | −85.379 | 1.200 | 1.496997 | 81.61 | |
| 22) | 78.949 | 3.884 | | | |
| 23) | −106.294 | 1.200 | 1.593190 | 67.90 | |
| 24) | 126.247 | 7.883 | | | |
| 25) | 84.389 | 3.000 | 1.720467 | 34.71 | |
| 26) | −937.027 | 35.448 | | | |
| 27) | 126.616 | 7.600 | 1.595510 | 39.21 | |
| 28) | −67.347 | 1.200 | 1.945944 | 17.98 | |

TABLE 1-continued

| | | | | |
|---|---|---|---|---|
| 29) | −126.151 | 22.187 | | |
| *30) | 111.791 | 6.100 | 1.612660 | 44.46 |
| *31) | −126.654 | 9.374 | | |
| *32) | −69.987 | 1.200 | 2.001003 | 29.13 |
| *33) | 240.688 | 6.450 | | |
| 34) | ∞ | 2.000 | 1.516800 | 63.88 |
| 35) | ∞ | 20.005 | | |

[Aspherical surface data]

ASP: 30th surface

K: −0.0945
A4: 0.00E+00  A6: −3.70E−06  A8: 6.64E−10  A10: −4.66E−11
A12: 3.48E−14
A14: −1.08E−16  A16: −2.85E−20  A18: 4.77E−23  A20: 3.35E−26

ASP: 31st surface

K: 2.8122
A4: 0.00E+00  A6: −4.69E−06  A8: −1.35E−09  A10: −3.95E−11
A12: −1.64E−14
A14: 8.73E−17  A16: −6.66E−20  A18: −6.27E−23  A20: −2.46E−26

ASP: 32nd surface

K: 3.0000
A4: 0.00E+00  A6: −7.94E−06  A8: 9.42E−09  A10: 1.32E−11
A12: 2.48E−15
A14: 9.89E−17  A16: 4.73E−29  A18: 6.43E−32  A20: −3.53E−25

ASP: 33rd surface

K: −1.0000
A4: 0.00E+00  A6: −8.82E−06  A8: 1.08E−08  A10: 5.92E−12
A12: 4.61E−14
A14: −6.54E−17  A16: −3.08E−29  A18: −7.29E−32  A20: 3.36E−25

[Focal length data of groups]

| Groups | Starting surfaces | Focal lengths |
|---|---|---|
| G1 | 1 | 379.315 |
| G2 | 14 | 138.094 |
| G3 | 16 | −85.999 |

[Variable distance data]

| | At focusing on infinity | At focusing on a nearby object |
|---|---|---|
| D13 | 24.000 | 4.100 |
| D15 | 4.000 | 23.900 |

Figure 2A:
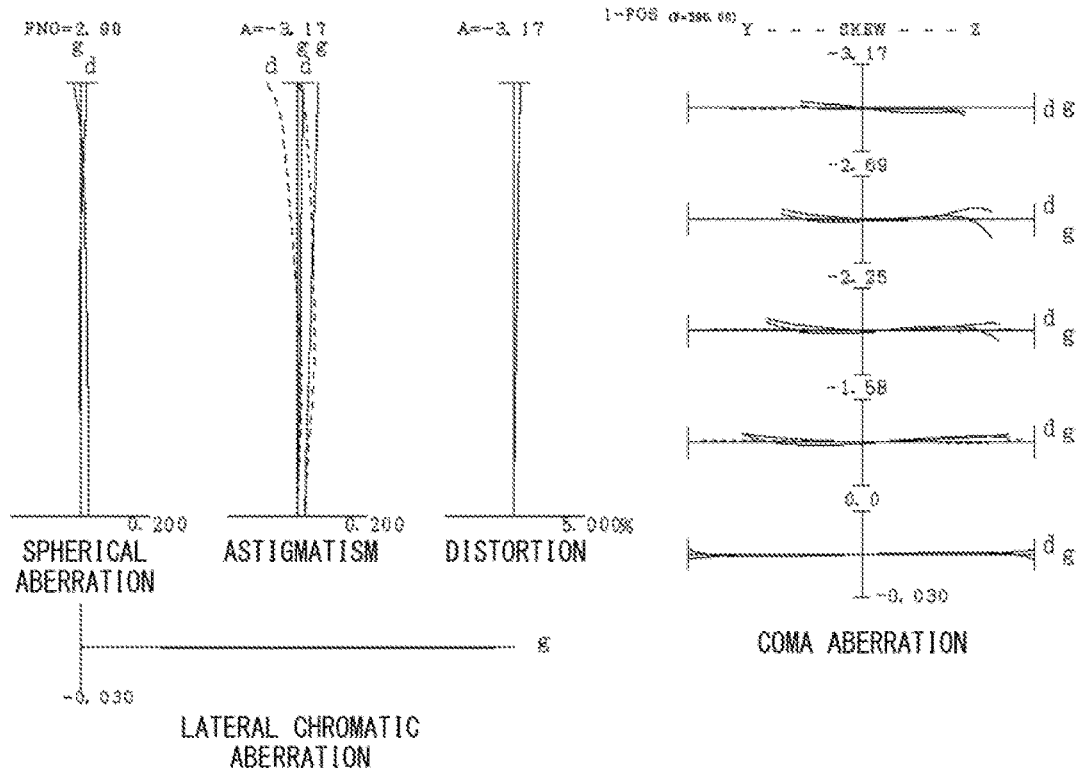
FIG. 2A shows aberrations of the optical system of the first example focusing on an object at infinity.
Figure 2B:
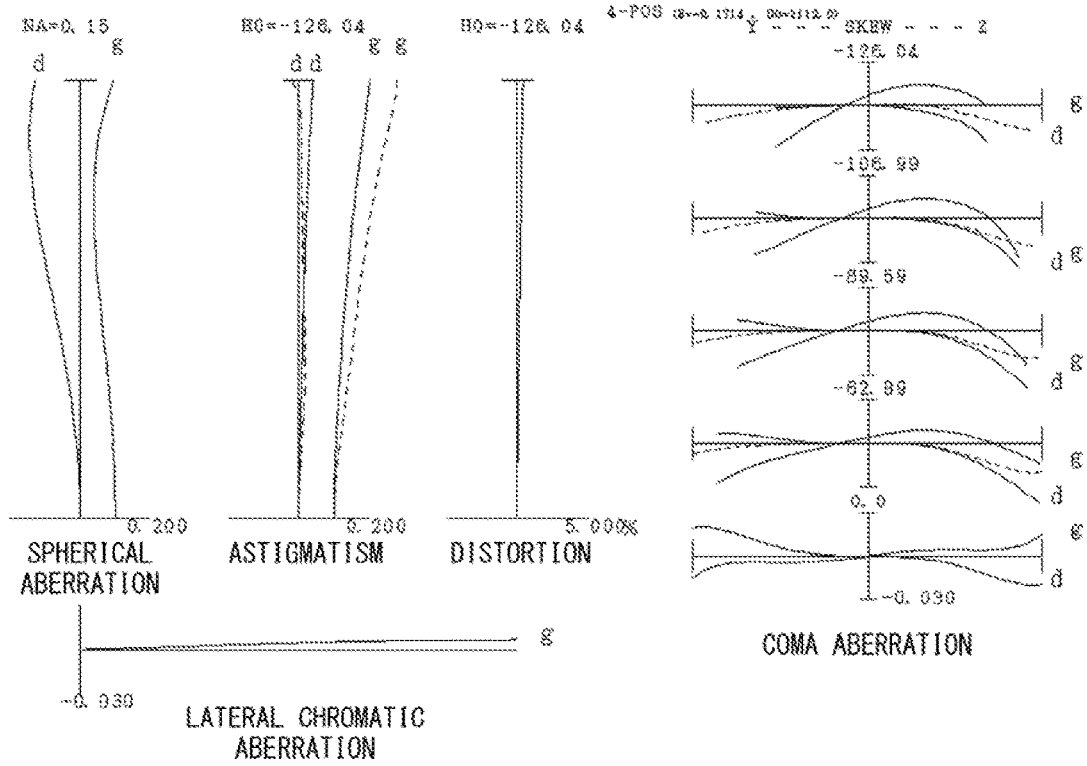
FIG. 2B shows aberrations of the optical system of the first example focusing on a nearby object.

FIG. 2A shows aberrations of the optical system of the first example focusing on an object at infinity. FIG. 2B shows aberrations of the optical system of the first example focusing on a nearby object.

In the graphs of aberrations, FNO and Y denote f-number and image height, respectively. More specifically, the graph of spherical aberration shows the f-number corresponding to the maximum aperture, the graphs of astigmatism and distortion show the maximum of image height, and the graph of coma aberration shows the values of image height. d and g denote d-line and g-line (wavelength 435.8 nm), respectively. In the graph of astigmatism, the solid lines and the broken lines show a sagittal plane and a meridional plane, respectively. The reference symbols in the graphs of aberrations of the present example will also be used in those of the other examples described below.

The graphs of aberrations suggest that the optical system of the present example effectively reduces variations in aberrations at focusing and has high optical performance.

Second Example

Figure 3:
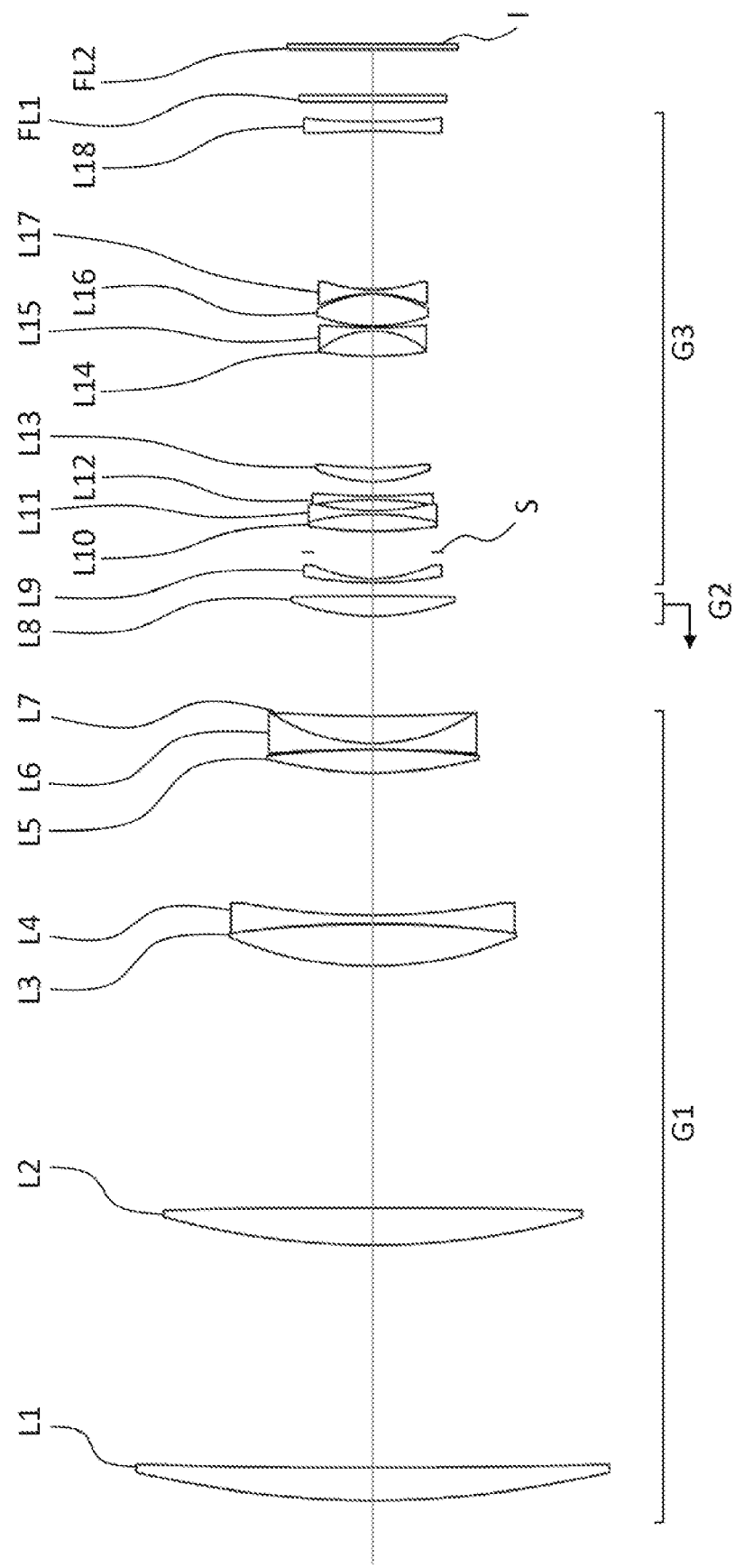
FIG. 3 is a cross-sectional view of an optical system of a second example focusing on an object at infinity.

FIG. 3 is a cross-sectional view of an optical system of a second example focusing on an object at infinity.

The optical system of the present example includes a first lens group G1 having positive refractive power, a second lens group G2 having positive refractive power, and a third lens group G3 having negative refractive power, in order from the object side.

The first lens group G1 includes a positive meniscus lens L1 convex on the object side, a biconvex positive lens L2, a biconvex positive lens L3, a biconcave negative lens L4, a biconvex positive lens L5, and a negative cemented lens composed of a biconcave negative lens L6 and a positive meniscus lens L7 convex on the object side, in order from the object side.

The second lens group G2 includes a biconvex positive lens L8.

The third lens group G3 includes a positive meniscus lens L9 convex on the object side; an aperture stop S; a negative cemented lens composed of a biconvex positive lens L10 and a biconcave negative lens L11; a biconcave negative lens L12; a positive meniscus lens L13 convex on the object side; a negative cemented lens composed of a biconvex positive lens L14 and a biconcave negative lens L15; a biconvex positive lens L16; a biconcave negative lens L17; and a biconcave negative lens L18, in order from the object side.

An imaging device (not shown) constructed from CCD, CMOS or the like is disposed on an image plane I.

Filters FL1 and FL2 are disposed between the optical system of the present example and the image plane I.

The optical system of the present example focuses by moving the second lens group G2 along the optical axis. When the focus is shifted from infinity to a nearby object, the second lens group G2 moves from the image side toward the object side.

In the optical system of the present example, the object-side lens surface of the negative lens L18 included in the third lens group G3 has a pole. The negative lens L18 corresponds to a negative lens that is a lens including a lens surface having a pole and that has negative refractive power. In the optical system of the present example, the positive lens L5 corresponds to the lens Z, the positive lenses L2 and L3 each correspond to the lens X.

Table 2 below shows specifications of the optical system of the present example.

TABLE 2

[General specifications]

| | |
|---|---|
| f | 588.00 |
| Fno | 4.09 |
| Bf | 24.200 |
| image height | 21.700 |
| TL | 458.000 |
| 2ω | 4.14 |

[Lens specifications]

| m | r | d | nd | νd | θgF |
|---|---|---|---|---|---|
| 1) | 318.082 | 10.293 | 1.518600 | 69.89 | |
| 2) | 2767.474 | 70.000 | | | |
| 3) | 250.000 | 11.741 | 1.433837 | 95.16 | |
| 4) | −2625.391 | 76.022 | | | |
| 5) | 117.178 | 13.094 | 1.433837 | 95.16 | |
| 6) | −358.058 | 0.243 | | | |
| 7) | −326.721 | 2.600 | 1.737999 | 32.26 | |
| 8) | 219.472 | 44.906 | | | |
| 9) | 136.873 | 7.129 | 1.663820 | 27.35 | 0.632 |
| 10) | −279.195 | 0.100 | | | |
| 11) | −417.537 | 1.900 | 1.800999 | 34.97 | |
| 12) | 57.256 | 8.730 | 1.437001 | 95.10 | |

TABLE 2-continued

| | | | | |
|---|---|---|---|---|
| 13) | 422.344 | D13 | | |
| 14) | 75.383 | 6.241 | 1.518230 | 58.82 |
| 15) | −1118.853 | D15 | | |
| 16) | 121.757 | 1.200 | 1.497820 | 82.57 |
| 17) | 42.268 | 8.586 | | |
| 18> | ∞ | 6.500 | (aperture stop) | |
| 19) | 153.272 | 5.178 | 1.808090 | 22.74 |
| 20) | −85.972 | 1.200 | 1.772500 | 49.62 |
| 21) | 74.810 | 3.582 | | |
| 22) | −107.276 | 1.200 | 1.816000 | 46.59 |
| 23) | 255.014 | 4.500 | | |
| 24) | 45.618 | 4.111 | 1.698950 | 30.13 |
| 25) | 130.848 | 35.282 | | |
| 26) | 102.108 | 7.814 | 1.698950 | 30.13 |
| 27) | −26.600 | 1.260 | 1.922860 | 20.88 |
| 28) | 212.812 | 0.460 | | |
| *29) | 50.919 | 10.000 | 1.647690 | 33.72 |
| *30) | −30.632 | 0.100 | | |
| 31) | −43.062 | 1.200 | 1.593190 | 67.90 |
| 32) | 52.042 | 50.049 | | |
| *33) | −119.867 | 3.013 | 1.848500 | 43.79 |
| *34) | 221837.780 | 6.000 | | |
| 35) | ∞ | 2.000 | 1.516800 | 64.13 |
| 36) | ∞ | 14.500 | | |
| 37) | ∞ | 1.600 | 1.516800 | 64.13 |
| 38) | ∞ | 0.100 | | |

[Aspherical surface data]

ASP: 29th surface

K: −3.5347
A4: 0.00E+00 A6: 3.84E−06 A8: 6.41E−10 A10: −3.33E−12
A12: 1.1E−14
ASP: 30th surface K: 1.24E+00
A4: 0.00E+00 A6: 8.39E−06 A8: 4.06E−09 A10: −3.49E−12
A12: 1.88E−14
ASP: 33rd surface K: 2.32E+01
A4: 0.00E+00 A6: 6.44E−06 A8: 2.40E−08 A10: −6.37E−11
A12: 5.19E−14
ASP: 34th surface

K: −2.27E+29
A4: 0.00E+00 A6: 2.46E−06 A8: 2.50E−08 A10: −5.95E−11
A12: 3.75E−14

[Focal length data of groups]

| Groups | Starting surfaces | Focal lengths |
|---|---|---|
| G1 | 1 | 445.504 |
| G2 | 14 | 136.523 |
| G3 | 16 | −44.174 |

[Variable distance data]

| | At focusing on infinity | At focusing on a nearby object |
|---|---|---|
| D13 | 31.468 | 17.198 |
| D15 | 4.100 | 18.370 |

Figure 4A:
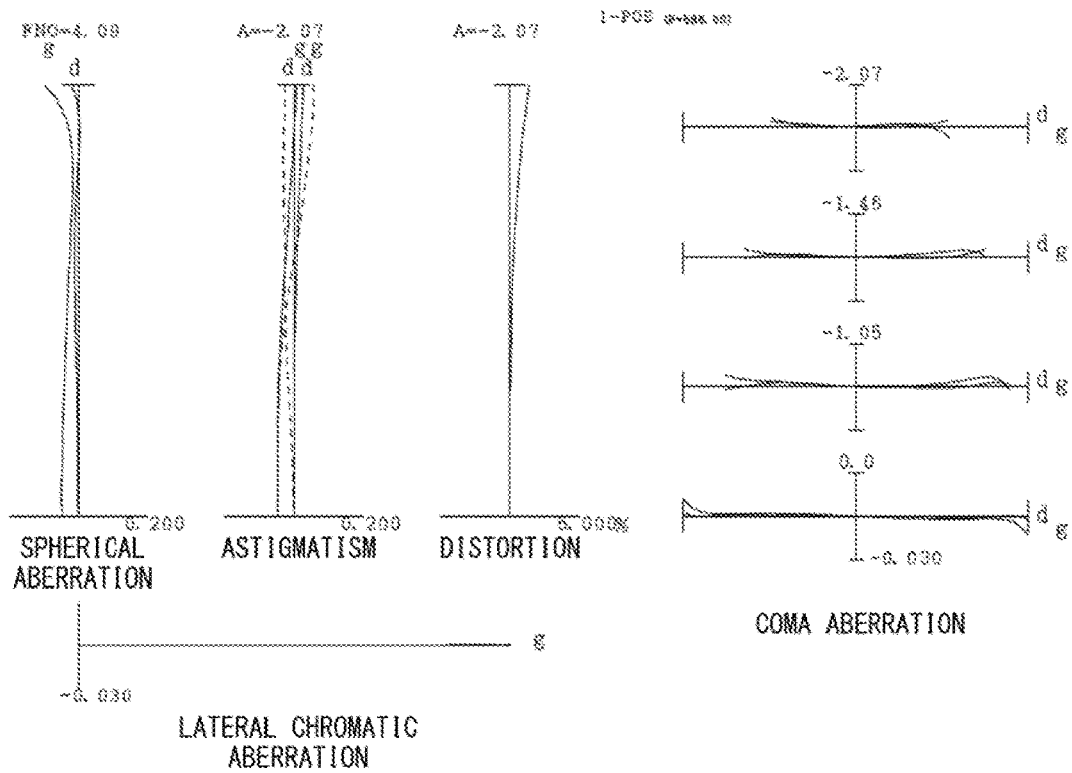
FIG. 4A shows aberrations of the optical system of the second example focusing on an object at infinity.
Figure 4B:
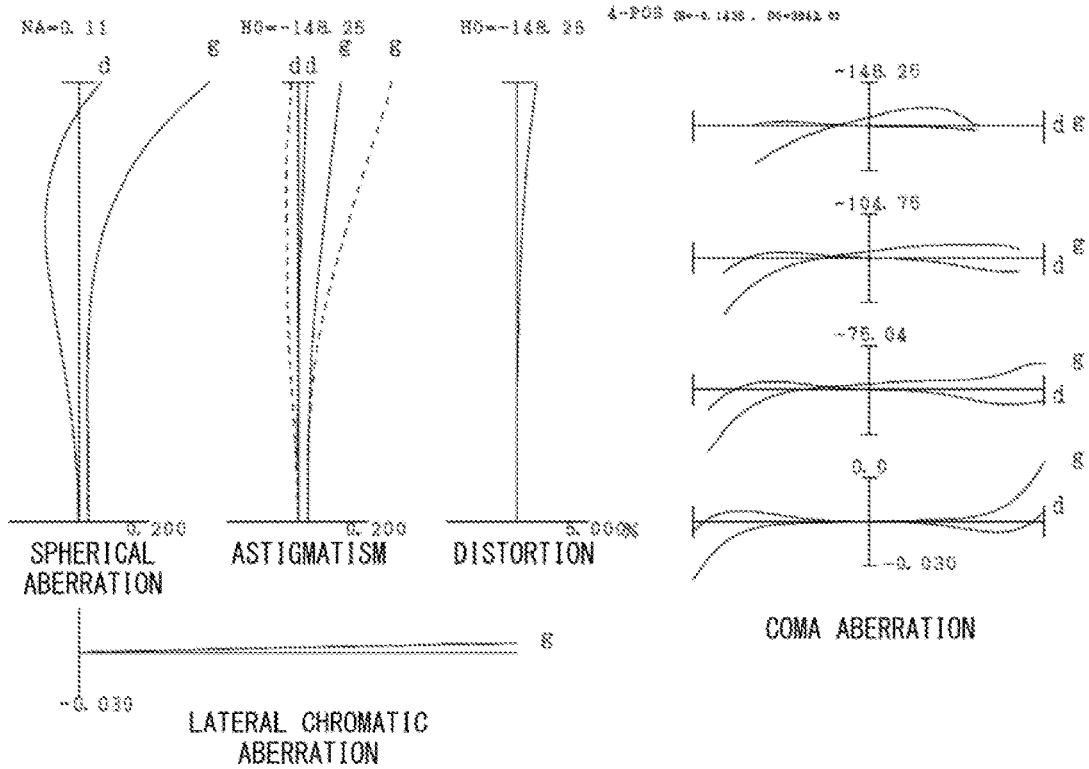
FIG. 4B shows aberrations of the optical system of the second example focusing on a nearby object.

FIG. 4A shows aberrations of the optical system of the second example focusing on an object at infinity. FIG. 4B shows aberrations of the optical system of the second example focusing on a nearby object.

The graphs of aberrations suggest that the optical system of the present example effectively reduces variations in aberrations at focusing and has high optical performance.

Third Example

FIG. 5 is a cross-sectional view of an optical system of a third example focusing on an object at infinity.

The optical system of the present example includes a first lens group G1 having positive refractive power, a second lens group G2 having negative refractive power, and a third lens group G3 having negative refractive power, in order from the object side. An aperture stop S is disposed between the first lens group G1 and the second lens group G2.

The first lens group G1 includes a positive meniscus lens L1 convex on the object side; a positive meniscus lens L2 convex on the object side; a negative meniscus lens L3 convex on the object side and having a multilayered and glued diffractive optical element GD made of two different materials on the image-side lens surface; a negative cemented lens composed of a biconvex positive lens L4 and a biconcave negative lens L5; a positive meniscus lens L6 convex on the object side; and a positive cemented lens composed of a negative meniscus lens L7 convex on the object side and a positive meniscus lens L8 convex on the object side, in order from the object side.

The second lens group G2 includes a biconcave negative lens L9.

The third lens group G3 includes a positive cemented lens composed of a negative meniscus lens L10 convex on the object side and a biconvex positive lens L11; a negative cemented lens composed of a biconvex positive lens L12 and a biconcave negative lens L13; a biconcave negative lens L14; a positive cemented lens composed of a biconvex positive lens L15 and a biconcave negative lens L16; a negative cemented lens composed of a biconvex positive lens L17 and a biconcave negative lens L18; a positive cemented lens composed of a biconvex positive lens L19 and a negative meniscus lens L20 convex on the image side; and a negative meniscus lens L21 convex on the image side, in order from the object side.

An imaging device (not shown) constructed from CCD, CMOS or the like is disposed on an image plane I.

The optical system of the present example focuses by moving the second lens group G2 along the optical axis. When the focus is shifted from infinity to a nearby object, the second lens group G2 moves from the object side toward the image side.

In the optical system of the present example, the negative cemented lens composed of the positive lens L12 and the negative lens L13 and the negative lens L14, which are lenses included in the third lens group G3, are configured as a vibration reduction lens group movable so that movement has a component in a direction perpendicular to the optical axis to correct an image blur.

In the optical system of the present example, the object-side and image-side lens surfaces of the negative meniscus lens L21 included in the third lens group G3 has a pole. The negative meniscus lens L21 corresponds to a negative lens that is a lens including a lens surface having a pole and that has negative refractive power. In the optical system of the present example, the positive meniscus lens L8 corresponds to the lens Z.

Table 3 below shows specifications of the optical system of the present example.

[Diffracting optical surface data] shows n (order of diffracted light), λ0 (designed wavelength), and C2 and C4 (phase coefficients) in the following equation (b) representing the phase shape ψ of the diffracting optical surface.

$$\psi(h,n)=(2\pi/(n\times\lambda 0))\times(C2h^2+C4h^4) \quad (b)$$

TABLE 3

[General specifications]

| | |
|---|---|
| f | 581.97 |
| Fno | 8.06 |
| Bf | 16.167 |
| image height | 21.600 |
| TL | 269.235 |
| 2ω | 4.17 |

[Lens specifications]

| m | r | d | nd | vd | θgF |
|---|---|---|---|---|---|
| 1) | 134.048 | 7.530 | 1.518600 | 69.89 | |
| 2) | 975.941 | 0.600 | | | |
| 3) | 93.756 | 8.246 | 1.518600 | 69.89 | |
| 4) | 332.255 | 9.686 | | | |
| 5) | 136.607 | 4.312 | 1.516800 | 64.13 | |
| 6) | 120.104 | 0.300 | 1.528300 | 36.18 | |
| 7) | 119.767 | 0.200 | 1.548900 | 51.30 | |
| 8) | 120.755 | 41.847 | | | |
| 9) | 88.622 | 5.436 | 1.518600 | 69.89 | |
| 10) | −416.992 | 2.000 | 1.903660 | 31.27 | |
| 11) | 41.602 | 5.323 | | | |
| 12) | 42.525 | 5.649 | 1.518600 | 69.89 | |
| 13) | 143.662 | 14.506 | | | |
| 14) | 47.751 | 2.000 | 1.903660 | 31.27 | |
| 15) | 28.892 | 4.794 | 1.663820 | 27.35 | 0.632 |
| 16) | 112.282 | 11.734 | | | |
| 17> | ∞ | D17 | (aperture stop) | | |
| 18) | −1154.419 | 1.200 | 1.487490 | 70.32 | |
| 19) | 62.576 | D19 | | | |
| 20) | 310.300 | 1.200 | 2.000690 | 25.46 | |
| 21) | 26.935 | 3.449 | 1.603420 | 38.03 | |
| 22) | −47.327 | 1.500 | | | |
| 23) | 48.394 | 3.086 | 1.672700 | 32.18 | |
| 24) | −44.128 | 1.100 | 1.497820 | 82.57 | |
| 25) | 26.495 | 2.410 | | | |
| 26) | −53.275 | 1.100 | 1.696800 | 55.52 | |
| 27) | 43.809 | 1.500 | | | |
| 28) | 24.114 | 4.701 | 1.603420 | 38.03 | |
| 29) | −25.443 | 1.200 | 1.497820 | 82.57 | |
| 30) | 29.757 | 8.994 | | | |
| 31) | 27.240 | 5.426 | 1.603420 | 38.03 | |
| 32) | −31.131 | 1.200 | 1.772500 | 49.62 | |
| 33) | 19.933 | 0.100 | | | |
| 34) | 20.086 | 7.524 | 1.603420 | 38.03 | |
| 35) | −18.471 | 1.200 | 1.922860 | 20.88 | |
| 36) | −83.172 | 44.826 | | | |
| *37) | −82.638 | 4.000 | 1.516800 | 64.13 | |
| *38) | −100.000 | 16.167 | | | |

[Aspherical surface data]

ASP: 37th surface

K: 1.0000
A4: 0.00E+00 A6: 2.01E−05

ASP: 38th surface

K: −3.4854
A4: 0.00E+00 A6: 1.93E−05 A8: −8.37E−09 A10: 7.40E−11
A12: −1.81E−13

TABLE 3-continued

[Diffracting optical surface data]
GD: 7th surface

| n | λ0 | C2 | C4 |
|---|---|---|---|
| 1 | 587.6 | −3.59E−05 | −9.39E−10 |

[Focal length data of groups]

| Groups | Starting surfaces | Focal lengths |
|---|---|---|
| G1 | 1 | 173.592 |
| G2 | 18 | −121.724 |
| G3 | 20 | −78.037 |

[Variable distance data]

| | At focusing on infinity | At focusing on a nearby object |
|---|---|---|
| D17 | 2.053 | 20.426 |
| D19 | 31.136 | 12.840 |

Figure 6A:
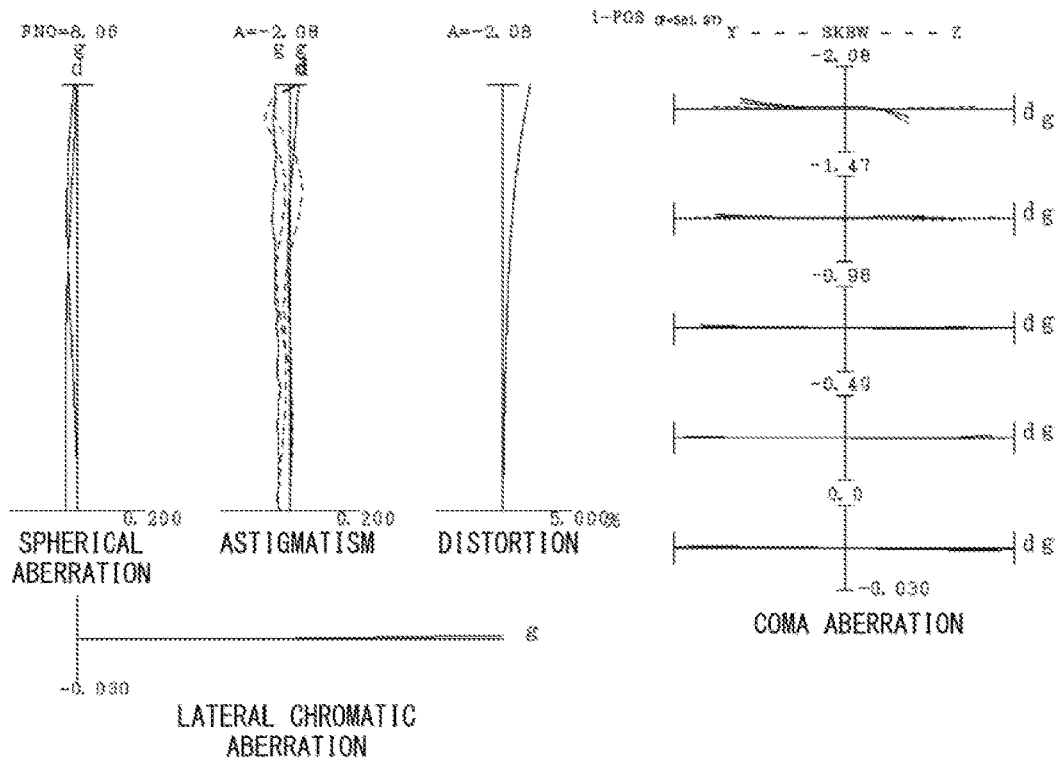
FIG. 6A shows aberrations of the optical system of the third example focusing on an object at infinity.
Figure 6B:
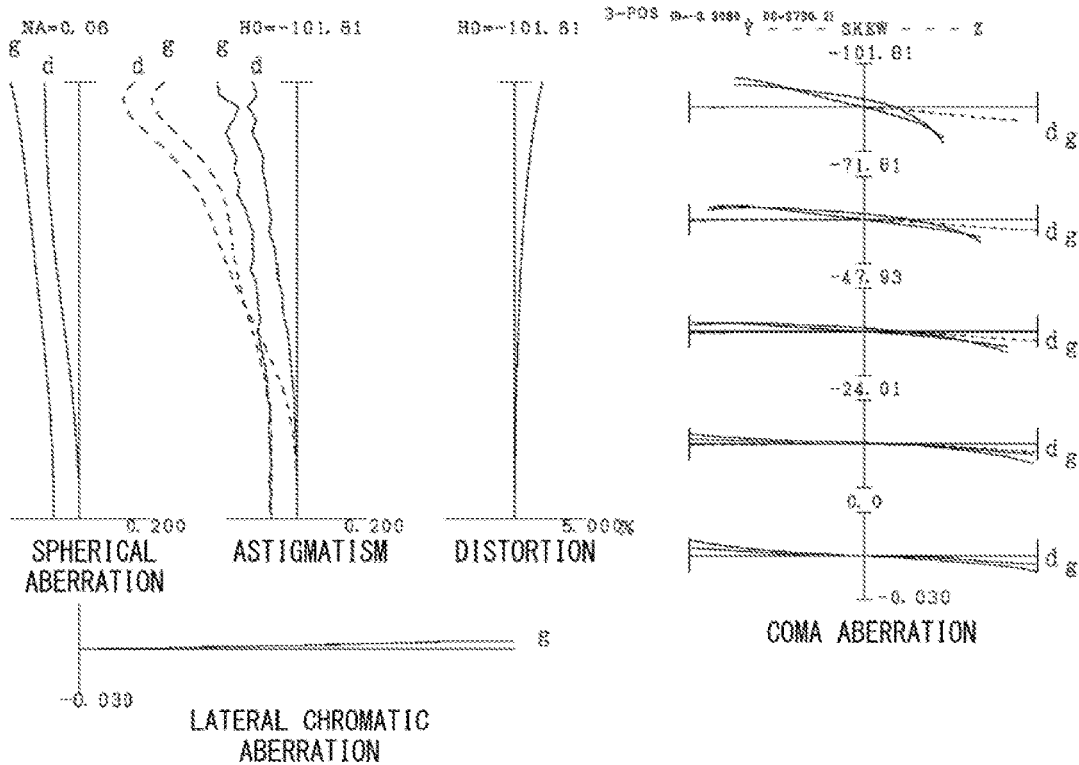
FIG. 6B shows aberrations of the optical system of the third example focusing on a nearby object.

FIG. 6A shows aberrations of the optical system of the third example focusing on an object at infinity. FIG. 6B shows aberrations of the optical system of the third example focusing on a nearby object.

The graphs of aberrations suggest that the optical system of the present example effectively reduces variations in aberrations at focusing and has high optical performance.

A small-sized optical system of favorable imaging performance can be achieved according to the above examples.

The following is a list of the conditional expressions and the values for the conditional expressions in the examples.

Y is image height, f is the focal length of the optical system, TL is the total optical length of the optical system, and Bf is the back focus of the optical system. h is the height from an optical axis of the pole closest to the optical axis on the lens surface having a pole. Dh is the thickness on an optical axis of a lens including the lens surface having a pole, Dc is the thickness at the pole of the lens including the lens surface having a pole, and rK is the effective radius of the lens including the lens surface having a pole.

KML is the distance from the lens surface having a pole closest to an image plane to the image plane. fK is the focal length of the lens including the lens surface having a pole. vdK is the Abbe number for d-line of the lens including the lens surface having a pole. fR is the focal length of the final lens group. rR is the radius of curvature of a lens surface disposed closest to the image side.

ndLZ is the refractive index for d-line of the lens Z, and θgFLZ is a partial dispersion ratio of the lens Z and is defined by the following equation:

$$\theta gFLZ=(ngLZ-nFLZ)/(nFLZ-nCLZ)$$

where the refractive indices for g-line, F-line, and C-line of the lens Z are denoted by ngLZ, nFLZ, and nCLZ, respectively.

vdLX is the Abbe number for d-line of the lens X.

[List of Conditional Expressions and their Values]

| | Conditional expressions: | First example | Second example | Third example |
|---|---|---|---|---|
| (1) | Y/f: | 0.056 | 0.037 | 0.037 |
| (2) | Bf/TL: | 0.073 | 0.053 | 0.060 |
| (3) | h/Y: | 0.724 | 0.915 | 0.571 |
| (4) | (Dh-Dc)/rK: | −0.105 | 0.073 | 0.009 |
| (5) | KML/TL: | 0.073 | 0.053 | 0.060 |
| (6) | rK/Y: | 0.943 | 0.924 | 0.838 |
| (7) | Bf/fK: | 0.291 | −0.171 | −0.016 |
| (8) | vdK: | 29.13 | 43.79 | 64.13 |
| (9) | fR/fK: | −0.879 | 0.313 | 0.078 |
| (10) | Bf/rR: | 0.118 | 0.000 | −0.162 |
| (11) | fK/f: | 0.251 | −0.240 | −1.717 |
| (12) | TL/f: | 0.993 | 0.779 | 0.463 |
| (13) | Bf/f: | 0.073 | 0.041 | 0.028 |
| (14) | ndLZ + (0.01425*vdLZ): | 2.054 | 2.054 | 2.054 |
| (15) | vdLZ: | 27.35 | 27.35 | 27.35 |
| (16) | θgFLZ + (0.00316*vdLZ: | 0.718 | 0.718 | 0.718 |
| (17) | vdLX: | 95.16 | 95.16 | |

The above examples illustrate specific examples of the present invention, and the present invention is not limited thereto. The following details can be appropriately employed unless the optical performance of the optical system of the embodiment of the present application is lost.

The lens surfaces of the lenses constituting any of the optical systems of the above examples may be covered with antireflection coating having high transmittance in a wide wavelength range. This reduces flares and ghosts, and enables achieving optical performance with high contrast.

Next, a camera including the optical system of the present embodiment is described with reference to FIG. 7.

Figure 7:
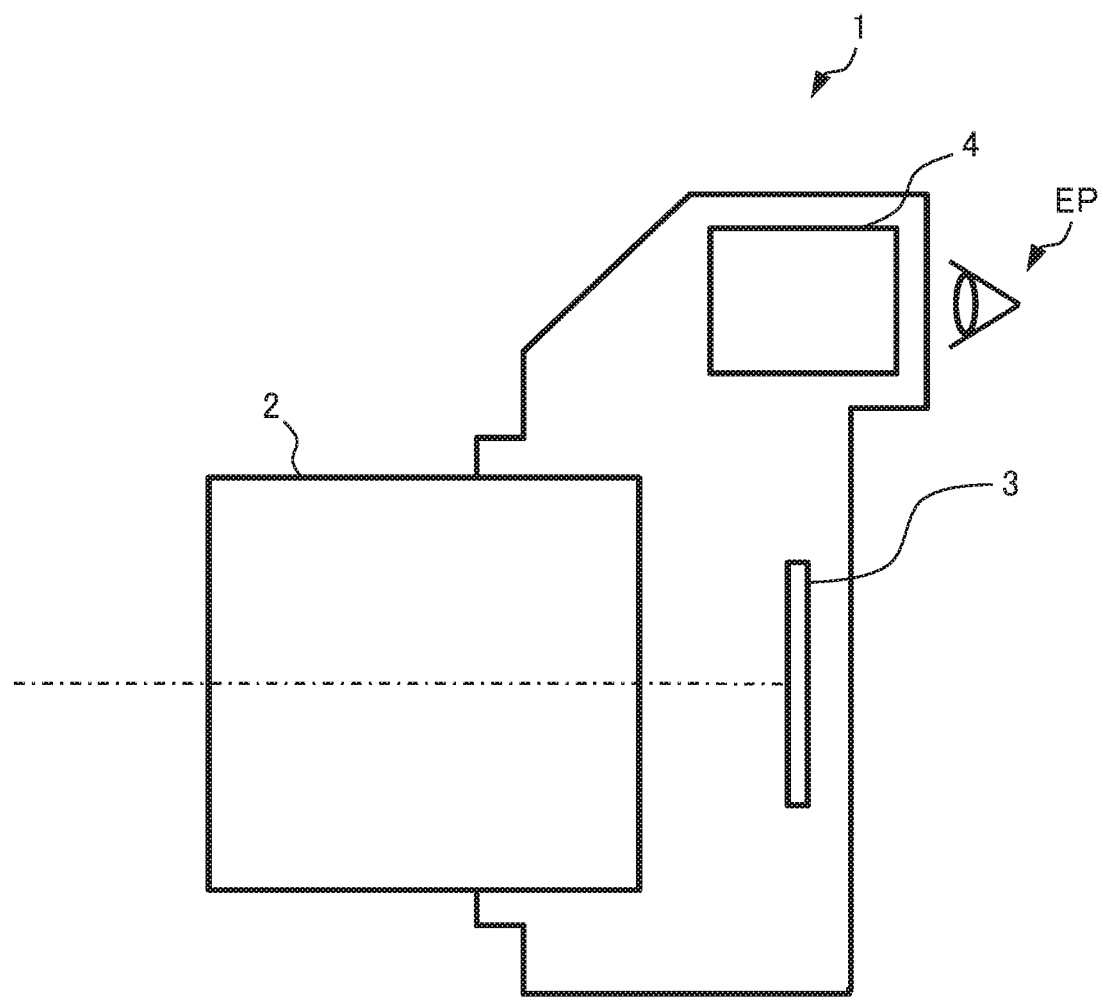
FIG. 7 schematically shows a camera including an optical system of the embodiment.

FIG. 7 schematically shows a camera including the optical system of the present embodiment.

The camera 1 is a "mirror-less camera" of an interchangeable lens type including the optical system according to the first example as an imaging lens 2.

In the camera 1, light from an object (subject) (not shown) is condensed by the imaging lens 2 and reaches an imaging device 3. The imaging device 3 converts the light from the subject to image data. The image data is displayed on an electronic view finder 4. This enables a photographer who positions his/her eye at an eye point EP to observe the subject.

When a release button (not shown) is pressed by the photographer, the image data is stored in a memory (not shown). In this way, the photographer can take a picture of the subject with the camera 1.

The optical system of the first example included in the camera 1 as the imaging lens 2 is a small-sized optical system of favorable optical performance. Thus the camera 1 can be small and achieve favorable optical performance. A camera configured by including the optical system of the second or third example as the imaging lens 2 can have the same effect as the camera 1.

Finally, a method for manufacturing an optical system of the present embodiment is described in outline with reference to FIG. 8.

FIG. 8 is a flowchart outlining a method for manufacturing an optical system of the present embodiment.

The method for manufacturing an optical system of the present embodiment shown in FIG. 8 is a method for manufacturing an optical system including a plurality of lens groups and includes the following steps S1 to S4:

Step S1: preparing a plurality of lens groups;
Step S2: arranging so that at focusing the distances between the lens groups are varied;
Step S3: arranging so that a final lens group disposed closest to an image side of the lens groups includes at least one lens surface having a pole; and
Step S4: making the optical system satisfy all of the following conditional expressions:

$$0.020 < Y/f < 0.120 \tag{1}$$

$$0.010 < Bf/TL < 0.150 \tag{2}$$

where
Y is image height,
f is the focal length of the optical system,
TL is the total optical length of the optical system, and
Bf is the back focus of the optical system.

A small-sized optical system of favorable imaging performance can be manufactured by the method for manufacturing an optical system of the present embodiment.

Note that those skilled in the art can make various changes, substitutions, and modifications without departing from the spirit and scope of the present invention.

REFERENCE SIGNS LIST

S aperture stop
I image plane
1 camera
2 imaging lens
3 imaging device

The invention claimed is:
1. An optical system comprising a plurality of lens groups,
at focusing the distances between the lens groups being varied,
a final lens group disposed closest to an image side of the lens groups including at least one lens surface having a pole,
all of the following conditional expressions being satisfied:

$$0.020 < Y/f < 0.120$$

$$0.010 < Bf/TL < 0.150$$

where
Y is image height,
f is the focal length of the optical system,
TL is the total optical length of the optical system, and
Bf is the back focus of the optical system.

2. The optical system according to claim 1, wherein the at least one lens surface having a pole satisfies the following conditional expression:

$$0.02 < h/Y < 1.20$$

where
h is the height from an optical axis of the pole closest to the optical axis on the lens surface having a pole.

3. The optical system according to claim 1, comprising one or more positive lenses that are lenses including the lens surface having a pole and that have positive refractive power, wherein
at least one of the one or more positive lenses satisfies the following conditional expression:

$$-0.15 < (Dh-Dc)/rK < 0.00$$

where
Dh is the thickness on an optical axis of a lens including the lens surface having a pole,
Dc is the thickness at the pole of the lens including the lens surface having a pole, and
rk is the effective radius of the lens including the lens surface having a pole.

4. The optical system according to claim 1, comprising one or more negative lenses that are lenses including the lens surface having a pole and that have negative refractive power, wherein
at least one of the one or more negative lenses satisfies the following conditional expression:

$$0.000 < (Dh-Dc)/rK < 0.100$$

where
Dh is the thickness on an optical axis of a lens including the lens surface having a pole,
Dc is the thickness at the pole of the lens including the lens surface having a pole, and
rk is the effective radius of the lens including the lens surface having a pole.

5. The optical system according to claim 1, wherein the following conditional expression is satisfied:

$$0.020 < KML/TL < 0.140$$

where
KML is the distance from the lens surface having a pole closest to an image plane to the image plane.

6. The optical system according to claim 1, wherein at least one lens including the lens surface having a pole satisfies the following conditional expression:

$$0.70 < rK/Y < 1.10$$

where
rk is the effective radius of the lens including the lens surface having a pole.

7. The optical system according to claim 1, wherein at least one lens including the lens surface having a pole satisfies the following conditional expression:

$$-0.40 < Bf/fK < 0.40$$

where
fK is the focal length of the lens including the lens surface having a pole.

8. The optical system according to claim 1, wherein at least one lens including the lens surface having a pole satisfies the following conditional expression:

$$25.00 < vdK < 70.00$$

where
vdk is the Abbe number for d-line of the lens including the lens surface having a pole.

9. The optical system according to claim 1, wherein at least one lens including the lens surface having a pole satisfies the following conditional expression:

$$-1.00 < fR/fK < 0.60$$

where
fR is the focal length of the final lens group, and
fK is the focal length of the lens including the lens surface having a pole.

10. The optical system according to claim 1, wherein the following conditional expression is satisfied:

$$-0.50 < Bf/rR < 0.20$$

where
rR is the radius of curvature of a lens surface disposed closest to the image side.

11. The optical system according to claim 1, wherein at least one lens including the lens surface having a pole satisfies the following conditional expression:

$$-2.00 < fK/f < 0.50$$

where
fK is the focal length of the lens including the lens surface having a pole.

12. The optical system according to claim 1, wherein the following conditional expression is satisfied:

$$0.20 < TL/f < 1.10.$$

13. The optical system according to claim 1, wherein the following conditional expression is satisfied:

$$0.005 < Bf/f < 0.100.$$

14. The optical system according to claim 1, comprising at least one lens Z satisfying all of the following conditional expressions:

$$ndLZ+(0.01425 \times vdLZ) < 2.12$$

$$vdLZ < 35.00$$

$$0.702 < \theta gFLZ+(0.00316 \times vdLZ)$$

where
ndLZ is the refractive index for d-line of the lens Z,
vdLZ is the Abbe number for d-line of the lens Z, and
θgFLZ is a partial dispersion ratio of the lens Z and is defined by the following equation:

$$\theta gFLZ=(ngLZ-nFLZ)/(nFLZ-nCLZ)$$

where the refractive indices for g-line, F-line, and C-line of the lens Z are denoted by ngLZ, nFLZ, and nCLZ, respectively.

15. The optical system according to a claim 1, comprising at least one lens X satisfying the following conditional expression:

$$80.00 < vdLX$$

where
vdLX is the Abbe number for d-line of the lens X.

16. The optical system according to claim 1, wherein a lens group disposed closest to an object side has positive refractive power.

17. An optical apparatus comprising the optical system according to claim 1.

18. A method for manufacturing an optical system including a plurality of lens groups,
at focusing the distances between the lens groups being varied,
a final lens group disposed closest to an image side of the lens groups including at least one lens surface having a pole,
the method comprising arranging so that all of the following conditional expressions are satisfied:

$$0.020 < Y/f < 0.120$$

$$0.010 < Bf/TL < 0.150$$

where
Y is image height,
f is the focal length of the optical system,
TL is the total optical length of the optical system, and
Bf is the back focus of the optical system.

* * * * *